April 12, 1938.  M. A. PIXLEY ET AL  2,113,744
SEALING MEANS
Original Filed May 27, 1935  2 Sheets-Sheet 1
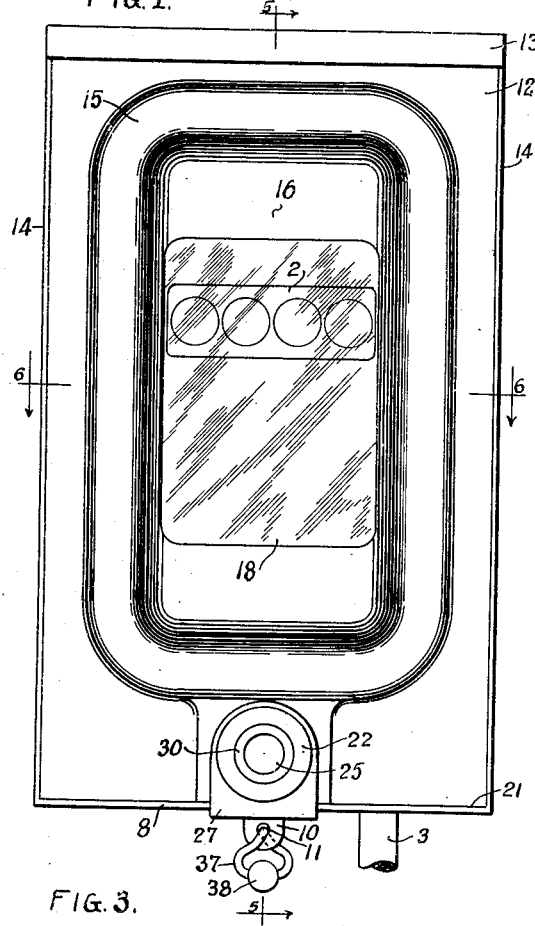
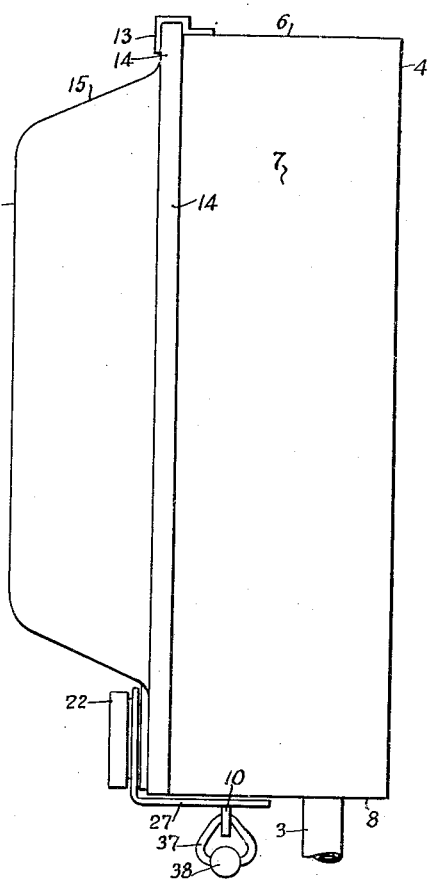
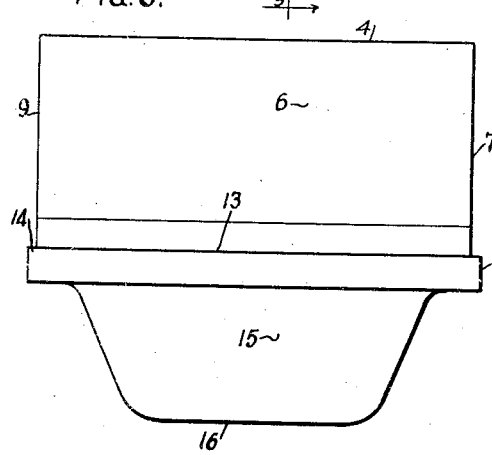
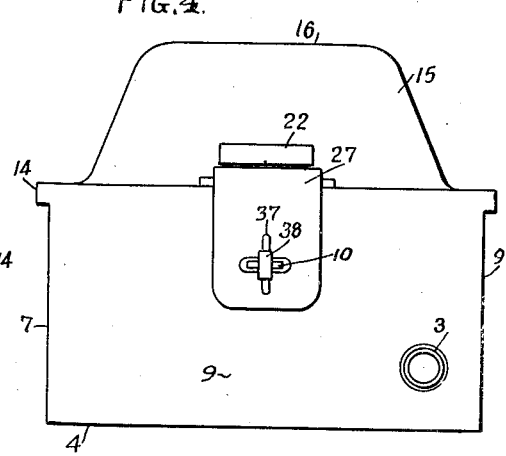
Inventors
MILTON A. PIXLEY,
EDWARD H. McCLOUD,
BY
Toulmin & Toulmin
Attorneys April 12, 1938.  M. A. PIXLEY ET AL  2,113,744
SEALING MEANS
Original Filed May 27, 1935  2 Sheets-Sheet 2
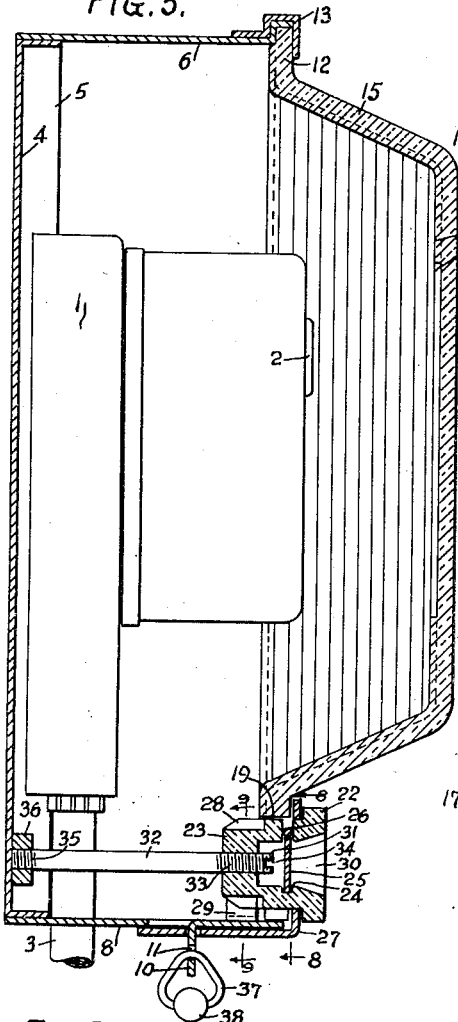
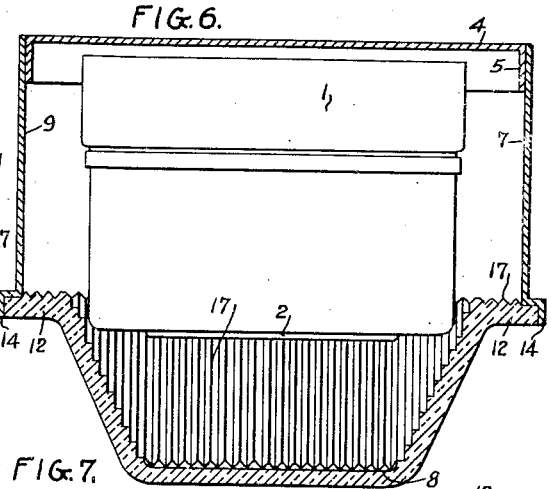
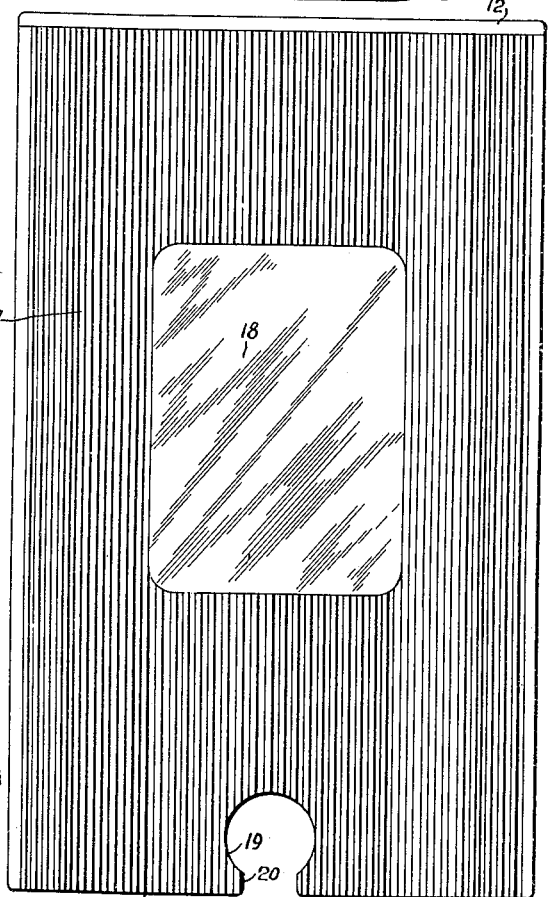
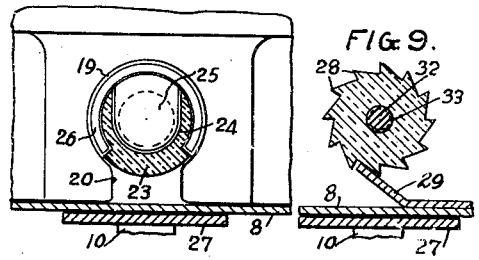
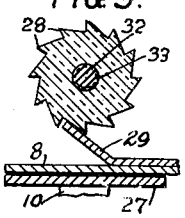
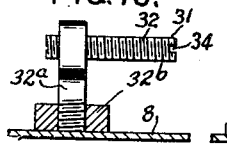
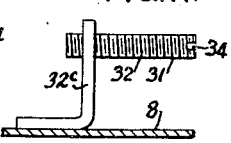
MILTON A. PIXLEY,
EDWARD H. McCLOUD, Patented Apr. 12, 1938

2,113,744

UNITED STATES PATENT OFFICE 2,113,744

SEALING MEANS

Milton A. Pixley and Edward H. McCloud, Columbus, Ohio

Original application May 27, 1935, Serial No. 23,620. Divided and this application February 11, 1936, Serial No. 63,400

6 Claims. (Cl. 292—327)

This invention relates to meter casings.

It is the object of this invention to provide a casing for an electric meter, particularly an electric meter for the measuring of current supplied to various types of establishments where it is desirable to have the usual metal and glass meter casing inclosed by a supplementary protective casing to prevent the meter being tampered with.

It is the particular object of the invention to provide a metal back and side walls of the supplementary casing and a glass cover comprising the front of the casing, which cover is struck-up to form a spaced, partially transparent and partially translucent cover so that the dials of the meter may be read through the front of the glass cover of the casing, while the glass is so remote from the front of the meter that it is substantially impossible for one who desires to drill the glass and tamper with the meter to accomplish such an object.

One of the problems in the protection of meters is to prevent the meter being tampered with by the penetration of the glass. This is effected by a drill and a lubricant or cutting agent for the glass. By having the glass cover of the supplementary casing arranged so that it is remote from the glass face of the inner casing of the meter, it is impossible to apply the lubricant or cutting agent to the surface of the inner glass on the inner meter casing.

It is a further object to provide such a glass cover partially transparent and partially translucent so that adequate light is admitted to the interior of the supplementary casing to permit of the reading of the meter, but the translucent portion of the glass cover makes it more difficult for anyone desiring to tamper with the meter to observe the meter and its parts and determine how to tamper with them.

It is a further object of this invention to provide a ribbed glass cover, with the ribs on the interior of the glass to give the translucent effect and to strengthen the glass, while at the same time providing a limited area without ribs, which is transparent.

It is a particular object to provide such a glass cover that can be inserted within the metal flange of the supplementary casing.

It is an additional object to provide a locking device of such character that when it is once locked and covered with a breakable cover, the lock cannot be tampered with for the opening of the casing without the breaking of the cover, and when once broken, it cannot be restored, so that any tampering with the case can be detected.

This is a division of our copending application Ser. No. 23,620, filed May 27, 1935.

Referring to the drawings:

Figure 1 is a front elevation of the supplementary casing.

Figure 2 is a side elevation thereof.

Figure 3 is a top plan view thereof.

Figure 4 is a bottom plan view thereof.

Figure 5 is a section on the line 5—5 of Figure 1.

Figure 6 is a section on the line 6—6 of Figure 1.

Figure 7 is an inside elevation of the glass cover of the supplementary casing.

Figure 8 is a section on the line 8—8 of Figure 5, looking in the direction of the arrows, showing the detailed arrangement of the lock.

Figure 9 is a section on the line 9—9 of Figure 5, looking in the direction of the arrows.

Figure 10 is a modified form of supporting the inner end of the attaching bolt 32.

Figure 11 is another modified form of supporting the inner end of the attaching bolt 32.

Referring to the drawings in detail, I designates a meter casing which is provided with a glass window 2. The cables supplying the meter enter the meter through the conduit 3. This meter casing is inclosed within a casing consisting of a metal back 4 having a flange 5, on which is mounted a rectangular side wall structure consisting of the sheets 6, 7, 8 and 9. The bottom wall 8 is punched to form a depending hasp 10 having an aperture 11.

The front of the casing is provided with a glass body having a flange 12 at the top and sides, which engages within the metal flanges 13 and 14 on the top and sides of the casing. This glass flange 12 is continued into an extended diagonal portion 15 and a front portion 16. The interior of the glass is formed in a plurality of ribs 17, except in the area 18, which is left clear as an observation window.

The bottom of the glass front is provided with an aperture 19 and a restricted throat 20, forming a slot connecting the aperture 19 and the bottom edge 21 of the glass front. Mounted in this slot is a locking plug, consisting of a head 22 and a body 23 having an arcuate slot 24 for receiving a glass window 25 and a retaining ring 26 which surrounds the outer edge of the glass window 25 and the outer surface of the plug at each side thereof to retain the glass window in the slot 24. The head 22 forms a shoulder for retaining the locking plate 27 between the plug and the glass wall of the front. The inner exterior end of the plug is formed with ratchet teeth 28 that are engaged by a dog or retaining finger 29 mounted on the wall 8 forming the bottom of the casing.

This plug is provided with a recess 30 which is closed off by the glass plate 25 to cover the head 31 of the retaining rod 32. This rod 32 is threaded at 33 into the rear end of the plug. It is slotted to receive a screw driver as at 34. The rear end of the plug is threaded at 35 within the retaining nut or lug 36 that is welded to the rear wall 4 of the casing. The plug locking plate 27 is slotted to receive the depending hasp or finger 10. It is retained in position by the strap 37 and lead seal 38, which are associated with the aperture 11 in the finger 10.

*Assembly of the lock*

When the glass cover has been put into position, and the rod 32 has been screwed into the retaining nut or lug 36, the plug is inserted through the locking plate 27 with its window 25 and retaining ring 26 in position, and rotated so that it is threaded upon the thread 33 of the rod 32 until the several parts are clamped together. The strap 37 and lead seal 38 are then applied. The glass cover is held in position because its flange 12 is within the flanges 13 and 14 of the metal casing. The engagement of the retaining finger 29 with the ratchet teeth prevents relative rotation between the plug and the bottom wall 8.

*Unlocking of the casing*

When it is desired to unlock the casing, the window 25 has to be broken. Then a screw driver is inserted in the slot 34 and the rod 32 rotated until it is detached from the retaining nut or lug 36. The locking plug can therefore be removed. Then the strap 37 is separated and the parts are disassembled.

As illustrated in Figure 10, the rod 32 may be screw threadedly secured to member 32a which, in turn, is screw threaded into the nut or lug 32b which is rigidly attached to the bottom wall 8 in any suitable manner, as by welding. In Figure 11, another modification is illustrated, wherein the rod 32 is screw threadedly secured to the upwardly extending arm of an L-shaped angle member 32c having its horizontal supporting leg portion welded or otherwise rigidly secured to the bottom wall 8.

In practice, it has been found that those who tamper with meters employ a drill and a cutting agent or lubricant for the drill, so as to be able to penetrate the glass tube. If this same operation is attempted to be performed on the glass cover of the supplementary casing, the cover being remote from the face 2, it is impossible for the person using the drill to apply the lubricant or cutting compound to the surface 2 and also apply the drill. Due to the restricted area of vision, it would only be an expert who would know enough about the meter to determine how to tamper with it, due to the opening 18 confining the view of the meter to a portion of its face. By having the extended glass front, sufficient light is diffused into the interior of the supplementary casing to permit of easy reading of the meter.

It will be understood that it is desired to comprehend within this invention such modifications as may be necessary to adapt it to varying conditions and uses.

Having thus fully described our invention, what we claim as new and desire to secure by Letters Patent, is:

1. In a sealing device for a casing having a slotted removable glass cover; a locking plug mounted in a slot in one portion of said glass cover, plug retaining means on said casing for detachably retaining said plug in position to lock said cover to the casing, and frangible means in said plug for providing access to said plug retaining means for removal of said cover from the casing.

2. In a sealing device for a casing having a slotted removable glass cover; a locking plug mounted in a slot in one portion of said glass cover, means on said casing for detachably retaining said plug in position to lock the cover to the casing, and a frangible window in said plug covering the attaching means of the plug to the casing.

3. In a sealing device for a casing having a slotted removable glass cover; a glass locking plug having a frangible window closing a chamber in said plug, a plurality of ratchet teeth on the exterior of said plug, a bolt threaded into said plug extending into the chamber in the plug behind the frangible window and threaded into the casing, and means on the casing for engaging the ratchet teeth of said plug to prevent its rotation in one direction.

4. In a sealing device for a casing having a slotted removable glass cover; a chambered glass locking plug mounted in said slot, said plug having ratchet teeth on a portion thereof, a finger on said casing engaging said teeth, a screw bolt screwed at one end into said casing and at the other end into said plug extending into the chamber thereof, and a frangible window in said plug covering the head of said screw bolt.

5. A new article of manufacture for use as a locking plug comprising a chambered plug having the exterior of one end formed into ratchet teeth and the interior of said end threaded for receiving a retaining bolt, a transversely arranged frangible member intersecting the chamber within the plug, and means for retaining said member in position in the plug.

6. A new article of manufacture for use as a locking plug comprising a chambered plug having the exterior of one end formed into ratchet teeth and the interior of said end threaded for receiving a retaining bolt, a transversely arranged frangible member intersecting the chamber within the plug, means for retaining said member in position in the plug, and a head on said plug.

MILTON A. PIXLEY.
EDWARD H. McCLOUD.